United States Patent [19]
Daspit

[11] 3,728,516
[45] Apr. 17, 1973

[54] WELDING POWER SOURCE

[76] Inventor: Alex D. Daspit, 3633 Fulton Street, N.W., Washington, D.C. 20007

[22] Filed: Oct. 16, 1970

[21] Appl. No.: 81,426

[52] U.S. Cl..................219/131 R, 219/135, 321/19, 323/22 SC
[51] Int. Cl. ................................................B23k 9/10
[58] Field of Search..........................219/131, 135; 323/20, 22; 321/19; 328/65, 115, 146, 147; 307/252 M, 252 T

[56] References Cited

UNITED STATES PATENTS

| | | | |
|---|---|---|---|
| 3,549,978 | 12/1970 | Stearns et al. | 219/135 X |
| 3,371,242 | 2/1968 | Aldenhoff et al. | 219/135 X |
| 3,337,769 | 8/1967 | Buchanan | 219/135 X |
| 3,480,852 | 11/1969 | Han-Min Hung | 323/20 X |
| 3,356,930 | 12/1967 | Lupoli et al. | 323/20 |
| 3,510,763 | 5/1970 | Clinton | 323/20 X |
| 3,530,359 | 9/1970 | Grist | 219/135 X |
| 2,777,973 | 1/1957 | Steele et al. | 219/131 X |
| 3,421,069 | 1/1969 | Mints | 321/19 X |

Primary Examiner—J. V. Truhe
Assistant Examiner—George A. Montanye
Attorney—Cushman, Darby & Cushman

[57] ABSTRACT

A power source for a welding machine wherein, in one embodiment, both the arc voltage and current are sensed and the frequency of a pulse train, which is integrated to produce the arc signal, is varied in accordance with the sensed voltage and current. In one embodiment, a capacitor is periodically semi-discharged through a switching device, such as an SCR. The resulting voltage pulse train is integrated to produce the welding signal. In another embodiment, two capacitors are alternately semi-discharged through separate current paths which each include a switching device, such as an SCR, and a common primary winding of a transformer by shifting the SCR's from their conductive to non-conductive states and vice versa. The transformer has two secondary windings one of which provides a high voltage, low current output and the other of which provides a high current output. Both outputs are integrated and combined to produce the welding signal.

19 Claims, 11 Drawing Figures

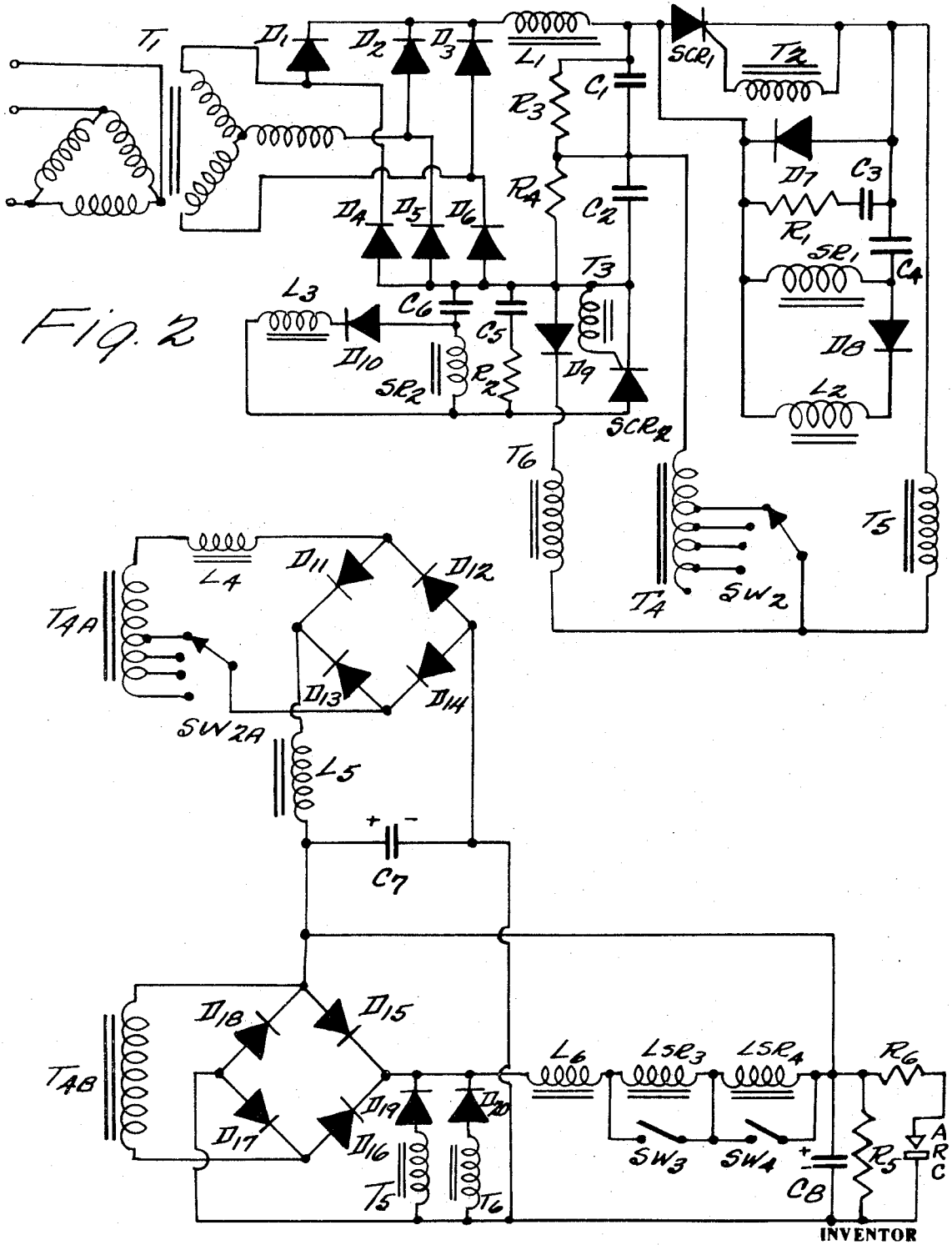

INVENTOR
ALEX D. DASPIT

BY Cushman, Darby & Cushman
ATTORNEYS

INVENTOR
ALEX D. DASPIT

WELDING POWER SOURCE

This invention is described in document disclosures Nos. 002388 and 002469.

BRIEF DESCRIPTION OF THE PRIOR ART AND SUMMARY OF THE INVENTION

The invention relates to a power source for an arc welder.

Arc welders currently in use, and particularly those selling for less than $2,500 use large unwieldy transformers or motor generator combinations, or small, power wasting resistors to supply power to the arc. Supplementary SCR's or magnetic amplifiers are often needed to accurately control arc conditions. Good supplies tend to be highly specialized — that is, a particular welder will often supply the proper output for optimum performance in only one type of welding, if a user wishes to get optimum results in another type of welding, he must purchase a new supply.

The present invention relates to a power source optimally suited for a wide variety of welding operations in which, in several embodiments the current and voltage at the arc are continuously monitored and the welding signal varied in accordance with the detected values of both and the predetermined relationship or "slope" between them. Further, a solid state switching arrangement is preferably employed to produce the welding signal by generating and then integrating a pulse train so that the welding signal can be varied as a function of detected current and voltage by varying the frequency of the train.

The pulse train may be used to generate both a high voltage, low current output and a high current output with both outputs being connected in parallel with the load. In one embodiment described below, this is accomplished by providing a first and second capacitor which are charged, for example, from a rectified A.C. source. The capacitors are each alternately partially discharged through separate current paths which each include a solid state switch, such as an SCR, with discharge beginning when the SCR is shifted from its non-conductive to its conductive state and ending when it is shifted from its non-conductive state. Both paths include the primary winding of a transformer having in addition first and second secondary windings. One of the secondary windings is connected to the arc to provide the high voltage, low current output and the other is connected to the arc to provide the high current output.

Many other objects and purposes of the invention will become clear from the following detailed description of the drawings.

BRIEF DESCRIPTION OF THE DRAWINGS

FIG. 2 shows the rectifier, inductor, energy storage device and pulse generator of FIG. 1.

FIG. 3 shows the low current output circuit, the high current output circuit, and the circuit for connecting the two outputs in parallel across the arc of FIG. 1.

DETAILED DESCRIPTION OF THE DRAWINGS

Figure 1:
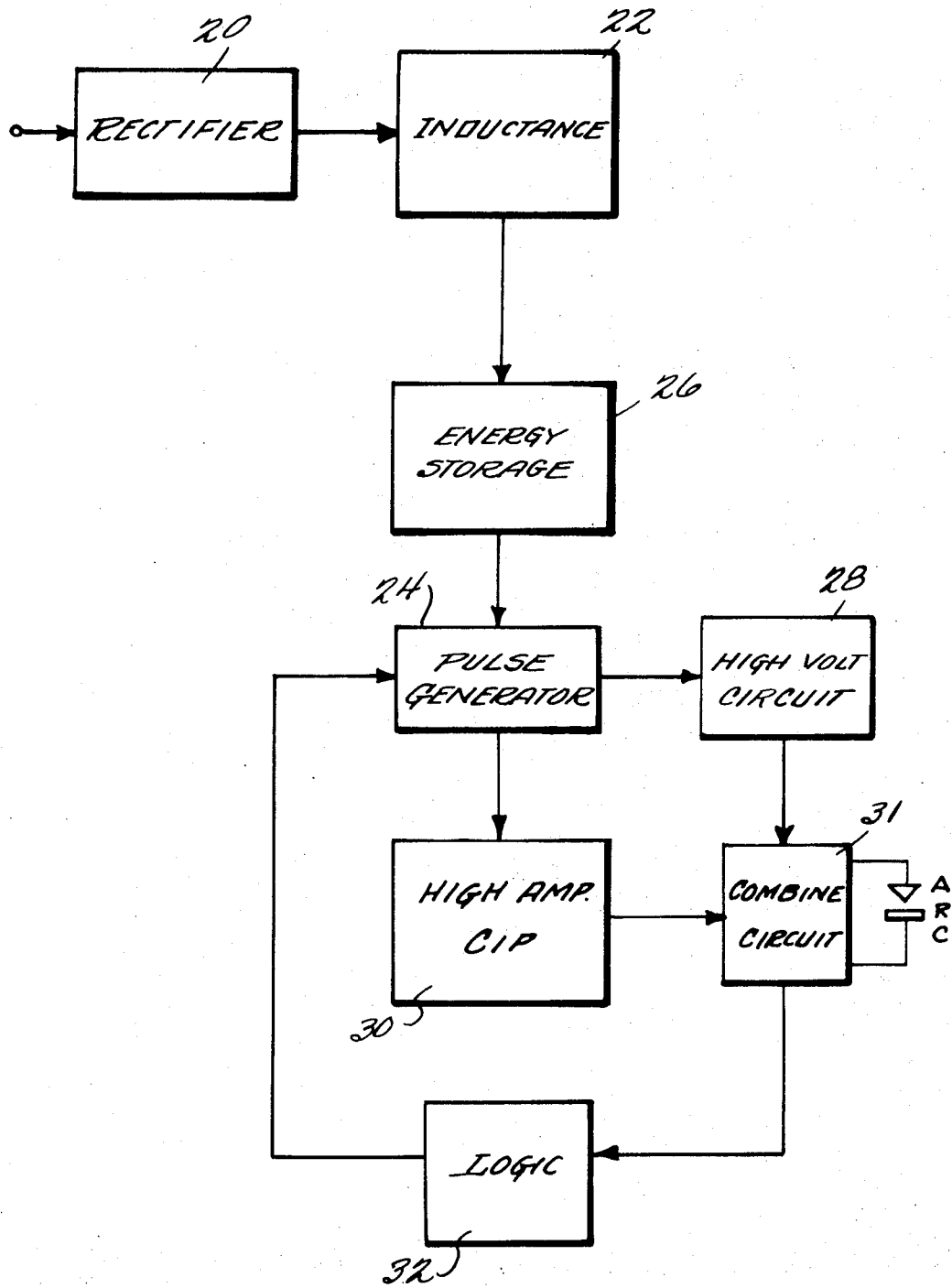
FIG. 1 shows a block diagram illustrating one embodiment of the invention.

Reference is now made to FIG. 1 which shows in block diagram one embodiment of the novel welding power supply of this invention. A conventional rectifier 20 such as, for example, a full-wave bridge is connected to a conventional alternating current source. If D.C. power is available, there will, of course, be no need for rectifier element 20. The output of rectifier 20 is applied to a small inductor 22 which serves to decrease the magnitude of the switching transients which are produced by pulse generator 24 as discussed in detail below. The output of inductor 22 is applied to pulse generator 24 via an energy storage device 26, such as a capacitor which also serves to further filter the signal received from conductor 22. Pulse generator 24 receives a D.C. signal and converts this signal into a pulse train comprised of a plurality of pulses of fixed width with the separation between adjacent pulses being varied in accordance with the arc conditions as discussed below.

One output of pulse generator 24 is applied to a low current output circuit 28 which provides an initial voltage across the arc of, for example, 80 volts. Another output of pulse generator 24 is applied to high current circuit 30 which provides the main arc current during welding. The outputs of circuits 28 and 30 are connected in parallel across the arc by a circuit 31 for operation of the welding equipment. During operation the current through the arc and voltage across it are constantly sensed and appropriate signals which vary as a function of that amperage and voltage supplied to logic circuit 32. Logic circuit 32 provides an output signal which controls the pulse separation between the pulses produced by generator 24 in accordance with the detected amperage and voltage conditions at the arc. Logic 32 can be adjusted for producing any desired relationship or "slope" between the amperage and voltage levels at the arc.

Reference is now made to FIG. 2 which shows in detail one possible configuration for rectifier 20, inductor 22, energy storage device 26 and pulse generator 24. Transformer $T_1$ represents the transformer which is normally presented in the power company line to provide a three-phase output at conventional voltage levels. This transformer does not represent a portion of the welding power source itself. Diodes $D_1$, $D_2$, $D_3$, $D_4$, $D_5$, and $D_6$ form a conventional three-phase, full-wave bridge rectifier which corresponds to rectifier 20 shown in FIG. 1. A relatively small inductor $L_1$ serves to reduce the magnitude of high-frequency interference transmitted back to the power line and is the inductor 22 of FIG. 1. Thus, the rectified output of transformer $T_1$ is applied via inductor $L_1$ across conventional capacitances $C_1$ and $C_2$ which represent the energy storage devices 26 of FIG. 1. Resistances $R_3$ and $R_4$ are connected in parallel with capacitances $C_1$ and $C_2$, respectively, and these resistances help to equalize the voltages across the capacitors $C_1$ and $C_2$ and permit the capacitors to discharge. For the purposes of clarity, the switches and circuit breakers which would be used to turn the power source on and off and protect it from overloads have been omitted from the schematic of FIG. 1 as well as the other Figures discussed below.

Capacitor $C_1$ is connected in a conductive discharge loop which includes electronic switch $SCR_1$, a winding of transformer $T_5$, switch $SW_2$ and the primary of transformer $T_4$. Similarly, capacitor $C_2$ is connected in a loop which also includes $SCR_2$, a winding of transformer $T_6$, switch $SW_2$ and the primary winding of transformer $T_4$. Thus, each time that one of the SCR's is switched from its non-conductive to its conductive position, the capacitor in its path discharges through that SCR and the associated winding of transformer $T_4$ or $T_5$. Thus, by alternately turning on the two SCR's for short constant periods of time, a pulse train having pulses of opposite polarity flows through the primary winding of transformer $T_4$.

Each of the SCR's is shifted to its conductive condition by a signal applied to that SCR via the secondary winding of transformers $T_2$ and $T_3$, as discussed below. After one of the SCR's is turned on, for example, $SCR_1$, the associated variation of the "Morgan" circuit, which for $SCR_1$ comprises diode $D_7$, capacitor $C_4$, saturable reactance $SR_1$, diode $D_8$ and inductance $L_2$ operates to commutate the circuit and to shift the SCR from its conductive back to its non-conductive condition where it remains until again triggered by a signal on the secondary of transformer $T_2$. Resistor $R_1$ and capacitor $C_3$ are dv/dt transient suppressors. This "Morgan" configuration is well known and no further discussion of the same is in order. However, the Morgan configuration is particularly advantageous in this circuit since no sudden pulse of commutation energy flows through the SCR associated therewith, so that an SCR with significantly lower maximum ratings can be employed than would be required than if such a pulse of current did flow through it. The Morgan circuit associated with $SCR_2$ operates in the same fashion.

The switch $SW_2$ permits the winding ratio between the primary and secondary of the transformer $T_4$ t be varied to permit any general range of arc voltages and currents to be chosen. For example, one tap might deliver 20,000 watts at 50 volts and up to 10,000 watts at 25 volts. Another tap might deliver up to 20,000 watts at 30 volts and up to 10,000 watts at 15 volts. The former setting would correspond to a maximum current of 400 amperes, while the latter would correspond to a maximum current of 660 amperes. The adjustment of the electronic logic 32, of course, determines the output "slope" characteristic and thus the actual arc voltage and current at any given moment.

Reference is now made to FIG. 3 which shows the circuits 28, 30 and 31 which receive the pulse train generated by generator 24 and apply a welding signal to the arc. The pulses which pass through the primary coil of transformer $T_4$ in FIG. 2 induce similar pulses in both the secondary windings labelled $T_{4A}$ and $T_{4B}$ of transformer $T_4$. The output of secondary winding $T_{4A}$ is applied to a full wave rectifying circuit comprised of diode $D_{11}$, $D_{12}$, $D_{13}$ and $D_{14}$ via an inductor $L_4$ which limits the current output of transformer winding $T_{4A}$ so as to provide an open circuit voltage at the output of the rectifier comprised of diodes $D_{11}$ through $D_{14}$. A capacitor $C_7$ and inductance $L_5$ are connected to the output of the full-wave rectifier as shown and operate to filter that output. The signals provided at the secondary coil $T_{4A}$ are applied to the welding arc via capacitance $C_8$, resistance $R_5$ and resistance $R_6$. Further, the output of transformer $T_{4A}$ provides a high voltage signal across the welding arc to initiate welding. As soon as the arc begins to draw substantial current, the voltage output of the secondary winding $T_{4A}$, which may be, for example, 80 volts, drops and most of the arc current comes from the other secondary winding $T_{4B}$.

The signals which pass through the primary winding of transformer $T_4$ also produce an output pulse train at the secondary $T_{4B}$ which is rectified by diodes $D_{15}$ through $D_{18}$ and applied to the welding arc. Inductance $L_6$ and swinging saturable reactances $LSR_3$, $LSR_4$ link the full-wave rectified output of winding $T_{4B}$ to the arc via the integrating circuit which includes resistor $R_5$ and capacitor $C_8$. The three inductances serve as swinging chokes to provide more or less equal filtering over the range of the output current. At progressively higher currents reactances $LSR_3$ and $LSR_4$ sequentially saturate and progressively more of the filtering inductance is supplied by $L_6$ which is preferably designed not to saturate at any load current which will be conveyed to the arc. Switches $SW_3$ and $SW_4$ are provided in parallel with swinging inductances $LSR_3$ and $LSR_4$, respectively, so that they can be shorted out if unneeded at high load currents. If desirable, these switches can be operated automatically whenever certain taps on the power transformer $T_4$ are chosen. Capacitors $C_7$ and $C_8$ both provide some filtering at low load currents and helps stabilize the output voltage under such conditions. $R_5$ serves as a bleeder resistor for capacitors $C_7$ and $C_8$, and further assists in no load voltage stabilization. It will generally be desirable to leave considerable high frequency ripple in the welding signal since the puddle vibration which results from the ripple improves weld quality. Resistor $R_6$ is preferably a low value resistor which serves as a current sensing shunt to provide information for the control logic and may simply be a length of copper wire. Switch $SW_{2A}$ is shifted with switch $SW_2$ to keep the output at secondary $T_{4A}$ constant if desirable.

Also connected across the output of the full-wave rectifier comprising diodes $D_{15}$ to $D_{18}$, is a winding of transformer $T_5$ connected in series with diode $D_{19}$ and a winding of transformer $T_6$ connected in series with diode $D_{20}$. The current passing through coils of winding $T_5$ and $T_6$ shown in FIG. 2 induce a signal in the corresponding windings of transformer $T_5$ and $T_6$ in FIG. 3 which corresponds to the inductive energy stored by $T_5$ and $T_6$ while reducing di/dt and dv/dt and is discharged into the arc.

Figure 4:
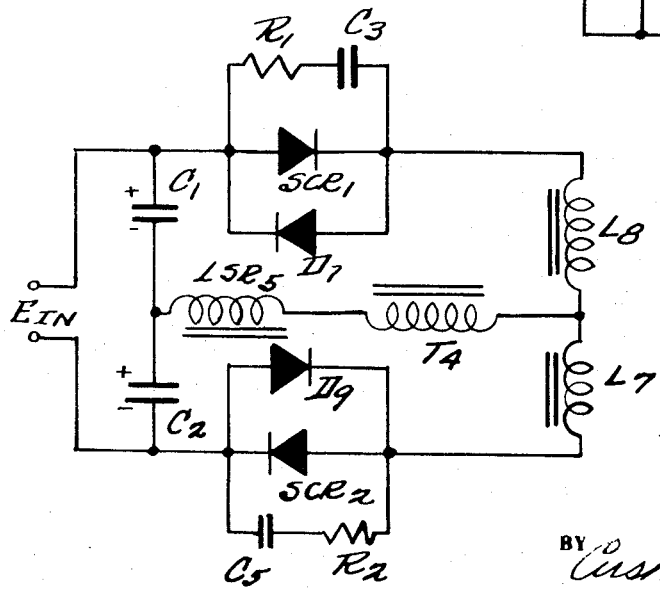
FIG. 4 shows an alternate inverter circuit for the pulse generator.

FIG. 4 illustrates another pulse generator similar to that of FIG. 2 in which the sharp rise suppression function is assumed by the "swinging" reactance $LSR_5$ which cannot generally have a secondary. Small induction coils $L_7$ and $L_8$ assist in this regard. In this configuration much of the inductively stored energy is delivered to the load through feedback diodes $D_7$ and $D_9$, with the rest of the energy returned to capacitances $C_1$ and $C_2$ by the same route except for that loss in resistive heating.

Figure 5:
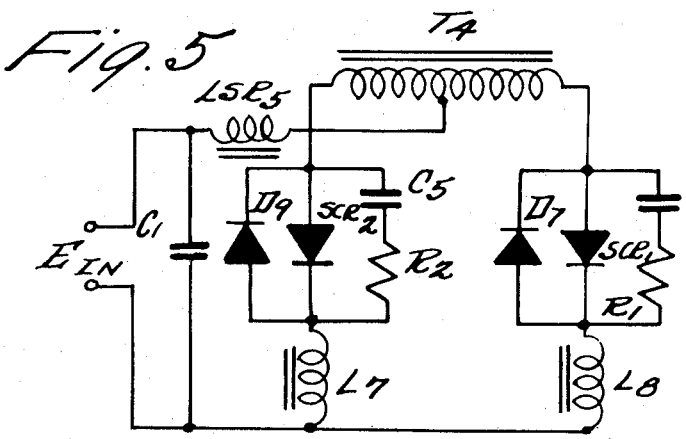
FIG. 5 shows another inverter circuit for the pulse generator.

FIG. 5 shows another similar configuration in which a center tapped transformer $T_4$ is employed eliminating the need for a center tap in the energy storage $C_1$ is the single input capacitor. In this arrangement, the components are thus subjected to twice the voltage but only half the current as in the embodiment illustrated in FIG. 2.

No bridge inverters are shown because the necessity for additional components makes them unattractive for most applications.

It may be desirable to provide, by any number of conventional means, power factor connection for transformer $T_4$ and the di/dt suppression inductor(s). This will prevent a possible excessive logging power factor at low load currents and thus help insure reliable high frequency inverters operation.

Figure 6:
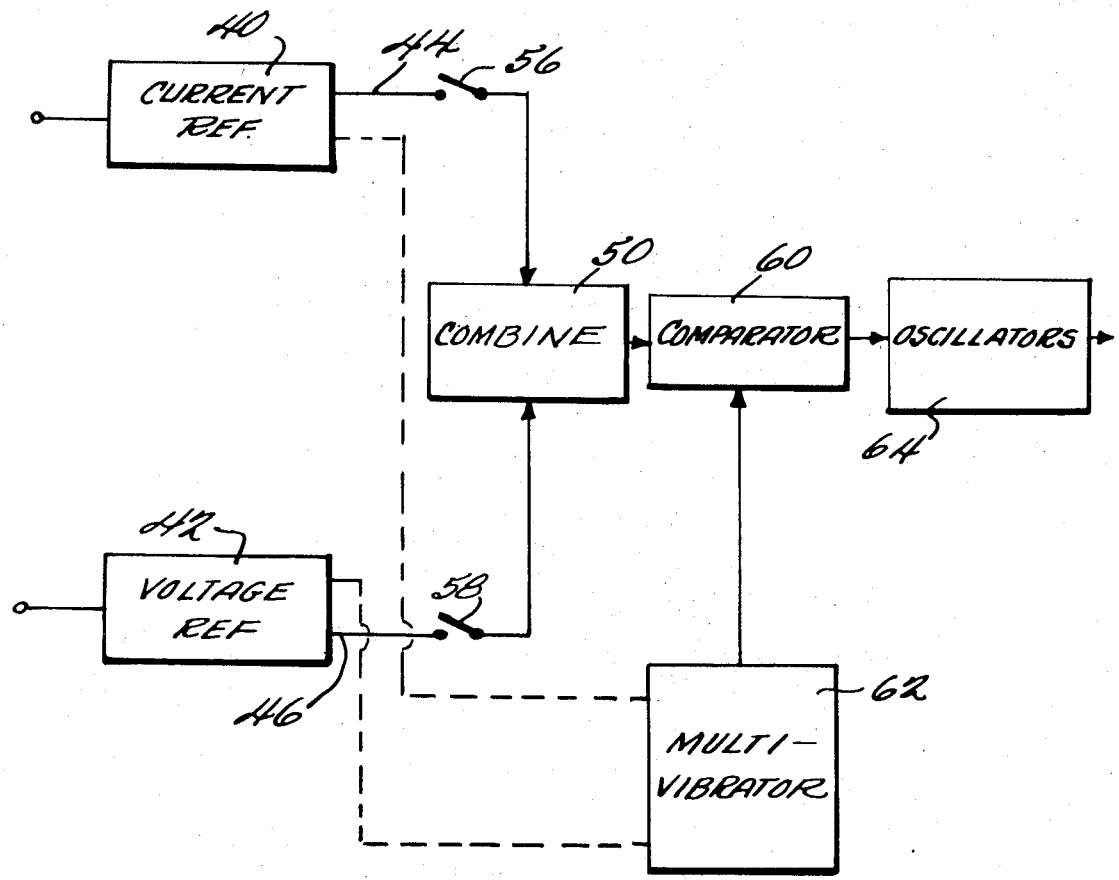
FIG. 6 shows a further block diagram of the logic for controlling the pulse generator.

Reference is now made to FIG. 6 which shows in greater detail a possible configuration of logic 32 of FIG. 1. As shown, a signal is provided to circuitry 40 which thus produces a signal which varies as a function of the current passing through the arc and a similar signal is delivered to circuitry 42 which produces a signal which varies as a function of the arc voltage. Circuits 40 and 42 contain elements such as adjustable linear and non-linear elements for operating upon the signals delivered thereto and for providing an output signal on lines 44 and 46, respectively, which are applied to a combine circuit 50 which provides an output signal on line 52 which is a composite of the two input signals. If switch 56 is open to disconnect circuitry 40 from block 50, and switch 58 closed, then the power supply responds only to the voltage output across the arc. Similarly, if switch 58 is opened, and switch 56 kept closed, the supply responds only to the current through the arc. In general operation both switches 56 and 58 will be closed so that the power supply will be controlled in accordance with a predetermined relation between the current and voltage conditions across the arc. By proving non-linear elements in circuits 40 and 42, this slope characteristic at a given setting need not be constant but can be varied as desired. Forward biased conventional diodes and backed biased zener diodes can serve as such non-linear elements. Although they are not strictly adjustable, they can be connected to various resistances and switches to accomplish this purpose.

The combine circuitry 50 may be a linear four quadrant multiplier or a summing function where the current and voltage signals are mixed to produce a single output signal. If a multiplier is used and circuits 40 and 42 are set to be suitably linear over most of the range, a truly constant power arc can be realized if desired. The output of circuitry 50 is applied to comparator circuitry 60 together with the output of a scaler 62 which controls the relative position of the sloped curve with regard to the voltage amperage axis. If desired, circuitry 62 can supply a cyclically varying reference for "pulsed arc" operation such as described, for example, in U.S. Pat. No. 3,071,680. Further logic may also be provided to effect over-compensation for change in electrode to work distance, to improve the effective response time of the working electrode, etc. The output of comparator circuit 60 controls the frequency, for example, of a push-pull symmetrical voltage controlled multivibrator blocking oscillator or oscillators represented as 64. The output of circuit 64 is applied to the primary windings of transformers $T_2$ and $T_3$ in order to alternately trigger $SCR_1$ and $SCR_2$.

Figure 7:
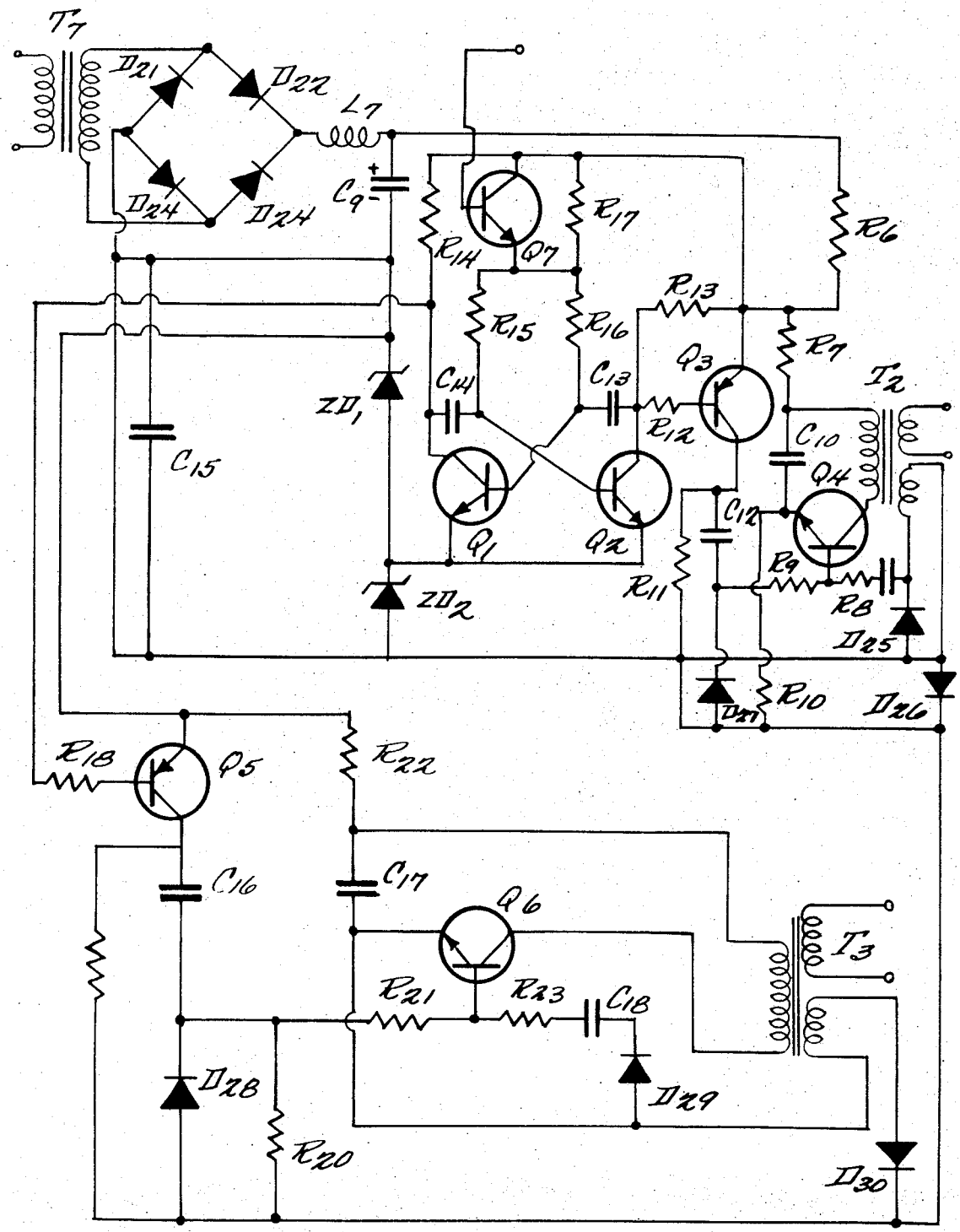
FIG. 7 shows a detailed schematic of a portion of the logic of FIG. 7.

Reference is now made to FIG. 7 which shows in further detail a possible version of block 64 of FIG. 6, the logic circuit for alternately switching on $SCR_1$ and $SCR_2$. The output of comparator 60 is applied to the gate of transistor $Q_7$ so that the resistance of transistor $Q_7$ and accordingly the frequency of the output of the multivibrator which includes transistors $Q_2$ and $Q_1$ is varied in accordance with the output of comparator 60. The output of the multivibrator which includes transistors $Q_1$ and $Q_2$ is applied to two hard fast switching blocking oscillators which include transistors $Q_3$ and $Q_4$, and $Q_5$ and $Q_6$, respectively. The output of these oscillators is applied to the primaries of windings $T_2$ and $T_3$ as shown to provide the switching signals which shift $SCR_1$ and $SCR_2$, respectively, from their non-conductive to their conductive condition.

Figure 9:
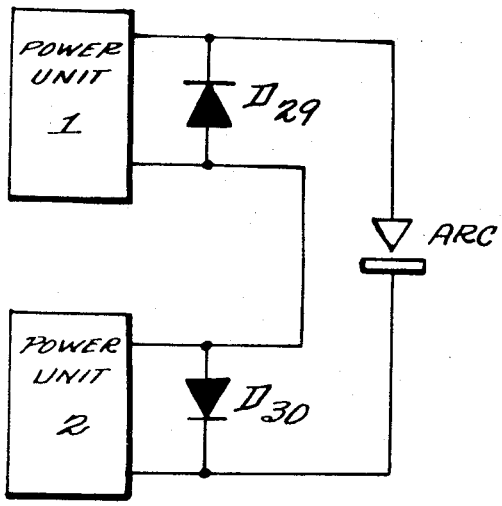
FIG. 9 shows yet another way in which the novel power source of this invention may be employed.
Figure 8:
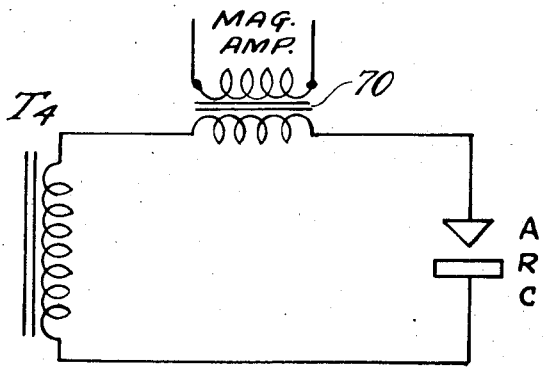
FIG. 8 shows a further way in which the novel power source of this invention may be employed.

One of the advantages of the invention is the flexibility of the basic unit. Different control circuitry and/or other circuitry may be provided in plug-in form to admirably adapt output and input characteristics to any particular application. Two examples of how the basic unit can be so modified are illustrated in FIGS. 8 and 9. In FIG. 8, the basic D.C. unit has been converted to a high frequency A.C. arc welder with conventional arc heating and some induction heating. The high frequency of operation guarantees reliable arc starting and maintenance at a safe open circuit voltage level, for example, 80 volts. The low current secondary and all the rectiification and filtering circuits are simply omitted in this embodiment. The primary transformer can be tapped to provide 80 volt open circuit and a magnetic amplifier 70 connected in series with the welding electrode can serve as the control device, using suitable additional control circuitry. The inverter is not used for voltage control and is locked fully on at typically 10–12 kilohertz.

FIG. 9 illustrates how two units can be connected to make a variable symmetry rectangular wave A.C. power source. In this embodiment the extra diodes needed and the bilateral control logic could be supplied by inexpensive plug-in modules of the type which will be readily apparent. The resulting unit can then be set up to supply different currents and slopes on a less complex version of the basic supply, suitable for lower current operation, is illustrated in FIGS. 10 and 11.

Figure 10:
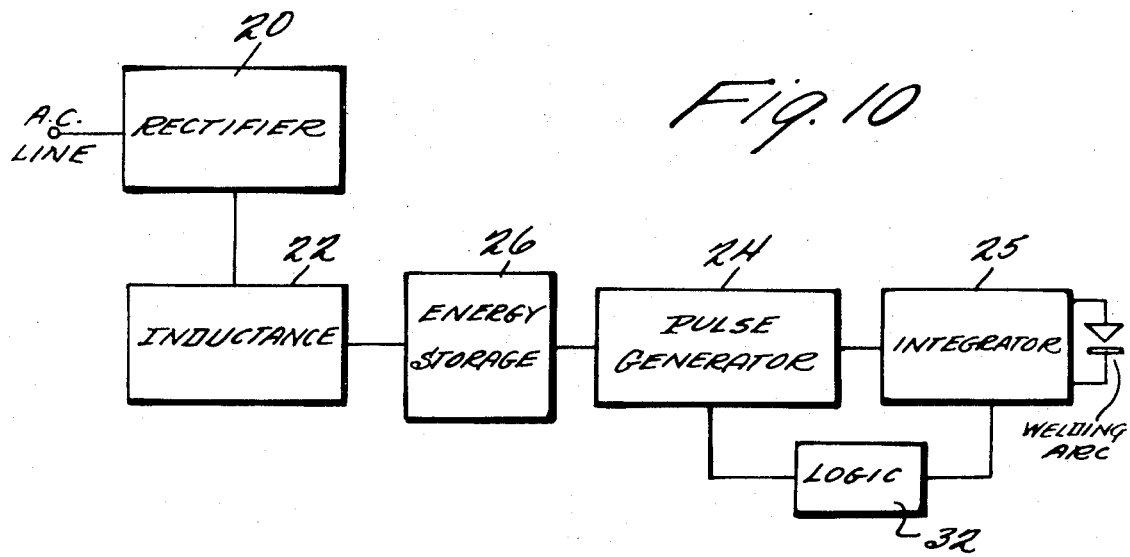
FIG. 10 shows a block diagram illustrating a less complex embodiment of the invention, suitable for lower current operation.

Referring to FIG. 10, Blocks 20, 22, and 26 are as in FIG. 1. Block 24 generates a train of pulses, preferably of fixed width and variable frequency. These are applied to integrator 25, which reduces the ripple to below 100 percent. The signal from 25 is delivered to the arc. Arc voltage and current are monitored by logic 32, which controls pulse frequency and is similar to the 32 of FIG. 1.

Figure 11:
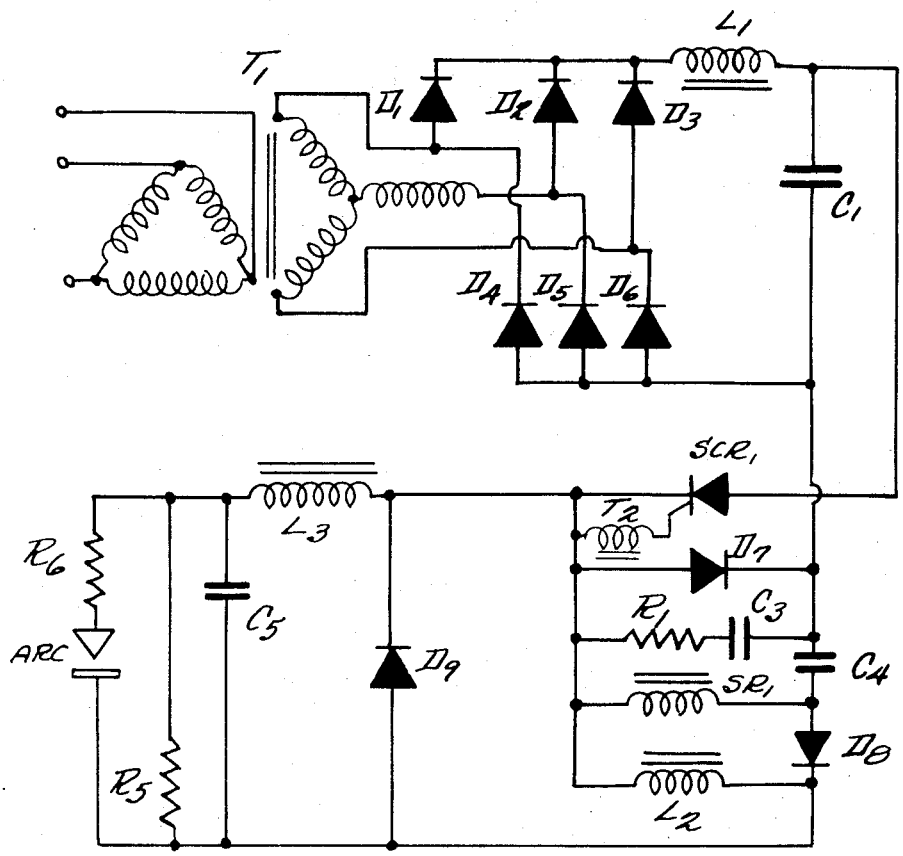
FIG. 11 shows the rectifier, inductor, energy storage device, pulse generator and output integrator of FIG. 10.

Referring to FIG. 11, $T_1$, $D_1$ through $D_6$, and $L_1$ are as in FIG. 2. $C_1$ is the input energy storage capacitor which reduces interference transmitted to the power line and stores energy for the pulse generator. The pulse generator is $SCR_1$, $T_2$, $D_7$, $D_8$, $R_1$, $C_3$, $C_4$, $SR_1$, $D_8$, and $L_2$ which function as in FIG. 2. Integration is performed by output filters $L_3$, $D_9$ and $C_5$. $R_5$ and $R_6$ are as in FIG. 3. The logic circuitry for FIG. 11 will be as in FIGS. 6 and 7 except in that the second blocking oscillator of FIG. 7, associated with $T_3$, is not needed.

The fact that the novel embodiments of this invention as described above can be easily used for a number of different applications through the use of inexpensive interchangeable plug-in modules permits the manufacturer of the device to increase the volume production advantages by producing many identical basic units instead of many different types of products with resulting lower production efficiency. The user need not pay for a completely new unit for specialized application, but only need buy an inexpensive plug-in for use with the basic supply.

From the above, it should be apparent that the novel power source of this invention is a lightweight and flexible source which can be economically produced and used in a variety of applications. Many changes and modifications in the above embodiments of the invention can, of course, be made without departing from the scope of the invention. Accordingly, that scope is intended to be limited only by the scope of the appended claims.

What is claimed is:

1. A power source for a welding machine comprising:
   means for providing a welding electrical signal, including means for generating a pulse train and means connected to said pulse train generating means for receiving and integrating said pulse train to produce said welding signal, said generating means including means for providing a direct current signal having at least a direct current component, energy storage means for receiving said direct current signal and storing energy to a given level, switching means connected to said energy storage means for switching from a conductive to a non-conductive state and from a non-conductive to a conductive state, and means for alternately causing said switching means to shift from a non-conductive to a conductive state and from said conductive to said non-conductive state to generate said pulse train,
   a pair of welding electrodes,
   means connecting said electrodes to said providing means for applying said welding signal to said electrodes,
   means for sensing both the voltage and current of said welding electrical signal applied to said electrodes, and
   means connected to said sensing means and responsive to both said sensed welding current and voltage for varying a characteristic of the welding electrical signal as a function of both the sensed current and voltage.

2. A source as in claim 1 wherein said varying means includes means for varying the frequency of the pulses generated by said generating means in accordance with both said sensed current and voltage.

3. A power source as in claim 1 wherein said energy storage means includes a first capcitor, and a second capacitor, wherein said switching means includes a first electronic switch connected in a current path with said first capacitor for discharging said first capacitor and a second electronic switch connected in a current path with said second capacitor for discharging said second capacitor so that the discharge of said first and second capacitors forms said pulse train and wherein said causing means includes means for causing said first and second electronic switches to be alternately conductive for a given period of time to generate said pulse train.

4. A power source as in claim 3 wherein said pulse generating means further includes a transformer having at least a single primary and at least a single secondary winding with said primary winding being connected in the discharge path of both of said capacitors and said secondary connected in a path which includes said integrating means and the welding electrodes.

5. A power source as in claim 3 further including inductance means connecting said D.C. signal providing means to said first and second capacitors for isolating transients from said D.C. signal providing means.

6. A power source as in claim 3 wherein said D.C. signal providing means includes means for providing an alternating current signal, and means for rectifying said provided alternating current signal and means for applying said rectified signal to said first and second capacitors.

7. A power source as in claim 3 wherein said electronic switches are silicon controlled rectifiers.

8. A power source as in claim 3 wherein said integrating means includes at least a single swinging saturable inductor.

9. A source as in claim 3 further including means for receiving said pulse train and producing a low current, constant open circuit output, means for receiving said pulse train and producing a high current output and means for combining said outputs and supplying them to said receiving and integrating means.

10. A power source as in claim 9 wherein said means for receiving said pulse train and producing said high and low current outputs comprises, a transformer having a primary and a first and second secondary winding with said primary winding being connected in the discharge path of both of said capacitors, one of said secondary windings being connected in a first path which includes said integrating means and the welding electrodes to provide said low current output and the other of said secondary windings being connected in a second path which also includes said integrating means and said welding electrodes to provide said high current output.

11. A power source as in claim 10 wherein said low current output producing means includes inductive means connected in said first path for limiting the current in said first path.

12. A power source as in claim 3 further including inductive means in said first capacitor discharging path for smoothing the pulses in that path and inductive means in said second capacitor discharging path for smoothing the pulses in that path.

13. A power source as in claim 3 wherein said energy storage means further includes a first inductance, connected in the currant path of said first capacitor and a second inductance, connected in the current path of said second capacitor.

14. A power source for a welding machine comprising:

means for providing a welding electrical signal, including means for generating a pulse train comprising switching means for switching between a conductive and a non-conductive state and between a non-conductive and a conductive state for providing a pulse train when operated, said providing means further including means for receiving and integrating said pulse train to produce said welding electrical signal, a pair of welding electrodes, means connecting said electrodes to said providing means for applying said welding electrical signal to said electrodes, means for sensing both the voltage and current of said welding electrical signal applied to said electrodes, and means connected to said sensing means and responsive to both said sensed welding current and voltage for varying a characteristic of the welding electrical signal as a function of both the sensed current and voltage including means connected to said sensing means for producing a first signal which varies as a function of current, means connected to said sensing means for producing a second signal which varies as function of voltage, means for receiving said first and second signals and producing a third signal which varies as a function of said first and second signals, astable multivibrator means connected to said third signal producing means for producing an output signal which varies in accordance with said third signal, and blocking oscillator means responsive to said astable multivibrator and connected to said switching means for operating said switching means to generate said pulse train.

15. A power source for a welding machine having at least a pair of electrodes comprising:

means for providing an electrical voltage signal having a direct current component, a pair of welding electrodes, means connecting said electrodes to said providing means and responsive to said providing means for applying a welding electrical signal to said electrodes comprising, capacitor means connected to said providing means so as to charge to a given voltage, a transformer having a primary coil connected to said capacitor means, and a secondary coil, switching means connecting said capacitor means to said primary coil of said transformer and having a first state in which said capacitor means discharges through said primary coil and a second state in which said switching means blocks discharge of said capacitor means through said primary coil, means connected to said secondary coil and to said pair of electrodes for receiving the signal produced in said secondary coil by the passage of current through said primary coil and supplying said welding electrical signal to said pair of electrodes, means for sensing both the voltage and current of said welding electrical signal, and means connected to said sensing means and responsive to both said sensed welding voltage and current for causing said switching means to alternately switch from said first state to said second state and from said second state to said first state such that the signal produced in said secondary coil by the passage of current through said primary coil has a characteristic which varies as a function of the sensed welding electrical signal.

16. A power source as in claim 15 wherein said capacitor means includes a first capacitor, and a second capacitor, wherein said switching means includes a first electronic switch connected in a current path with said first capacitor and said primary coil and a second electronic switch connected in a current path with said second capacitor and said primary coil and wherein said causing means includes means for causing said first and second electronic switches to be alternately conductive for a given period of time to generate a pulse train.

17. A power source as in claim 16 wherein said receiving and supplying means includes means for integrating said pulse train to form said welding electrical signal.

18. A power source for a welding machine having at least a pair of electrodes comprising:

means for providing an electrical voltage signal having a direct current component, a pair of welding electrodes, means connecting said electrodes to said providing means and responsive to said providing means for applying a welding electrical signal to said electrodes, comprising capacitor means connected to said providing means so as to charge to a given voltage including a first and second capacitor, first switching means connected in a current path with said first capacitor, second switching means connected in a current path with said second capacitor, a transformer having a primary coil connected in said first and second capacitor paths, and at least one secondary coil, means for alternately causing said first and second switching means to shift from a conductive to a non-conductive state and from said non-conductive to said conductive state to generate a pulse train, and means connected to said at least one secondary coil and to said pair of electrodes for receiving said pulse train produced in said secondary coil by the passage of current through said primary coil, integrating said pulse train and supplying the integrated pulse train to said pair of electrodes.

19. A source as in claim 18 wherein said at least one secondary coil comprises has first and second secondary coils and wherein said receiving, integrating and supplying means comprises, means connected to said first secondary coil for supplying a high voltage, low current output pulse train, means connected to said second secondary coil for supplying a high current output pulse train, and means for integrating the output pulse trains from said high and low current outputs and supplying the integrated pulse trains to said electrodes.

* * * * *